United States Patent [19]

Abraham et al.

[11] Patent Number: 5,161,225

[45] Date of Patent: Nov. 3, 1992

[54] PERSISTENT STREAM FOR PROCESSING TIME CONSUMING AND REUSABLE QUERIES IN AN OBJECT ORIENTED DATABASE MANAGEMENT SYSTEM

[75] Inventors: Robert L. Abraham; Michael P. Priven, both of Marietta, Ga.

[73] Assignee: International Business Machines Corporation, Armonk, N.Y.

[21] Appl. No.: 425,747

[22] Filed: Oct. 23, 1989

[51] Int. Cl.⁵ .............................................. G06F 15/40
[52] U.S. Cl. ............................... 395/600; 364/DIG. 1; 364/282.3
[58] Field of Search ................. 364/DIG. 1 MS File, 364/DIG. 2 MS File; 395/600

[56] References Cited

U.S. PATENT DOCUMENTS

| | | | |
|---|---|---|---|
| 4,506,326 | 3/1985 | Shaw et al. | 364/DIG. 2 |
| 4,509,119 | 4/1985 | Gumaer et al. | 364/DIG. 1 |
| 4,604,686 | 8/1986 | Reiter et al. | 364/DIG. 1 |
| 4,631,664 | 12/1986 | Bachman | 364/DIG. 1 |
| 4,642,762 | 2/1987 | Fisanick . | |
| 4,747,072 | 5/1988 | Robinson et al. | 364/DIG. 2 |
| 4,769,772 | 9/1988 | Dwyer | 364/DIG. 1 |
| 4,791,550 | 12/1988 | Stevenson et al. | 364/DIG. 1 |
| 4,811,199 | 3/1989 | Kuechler et al. | 364/DIG. 1 |
| 4,821,220 | 4/1989 | Duisberg | 364/578 |
| 4,841,433 | 6/1989 | Hakim et al. | 364/DIG. 1 |
| 4,853,843 | 8/1989 | Ecklund | 364/DIG. 1 |
| 4,866,634 | 9/1989 | Reboh et al. | 364/DIG. 2 |
| 4,949,251 | 8/1990 | Griffin et al. | 364/DIG. 1 |

OTHER PUBLICATIONS

IBM Technical Disclosure Bulletin, "Dynamic Positioning Of Object Data Portions Within A Single Presentation Area", pp. 231-232, vol. 31, No. 11, Apr. 1989.

IBM Technical Disclosure Bulletin, "Rules For Interchange In A Mixed Object Document Data Stream", pp. 196-197, vol. 32, No. 1, Jun. 1989, Apr. 1989.

Primary Examiner—Thomas M. Heckler
Attorney, Agent, or Firm—Bell, Seltzer, Park & Gibson

[57] ABSTRACT

Time consuming and reusable queries are handled in an object oriented database management system by providing a persistent stream object class. The persistent stream object class is a subclass of the stream class which is typically provided to encapsulate the results of a query. The persistent stream class inherits all the attributes and methods of the stream class but also includes a "save" method for saving the results of a query. When a query names a persistent stream as it object, the query results are saved. The query may also be performed in background or batch mode. All time consuming and reusable queries are performed by sending a query message to the persistent stream class, to thereby automatically save the query results.

25 Claims, 6 Drawing Sheets

MYSTREAM

| OBJ ID OF THIS P-STREAM | SEARCH CRITERIA 1 | SEARCH CRITERIA 2 | SEARCH CRITERIA 3 | SAVED = NO | SEQ DATA SET (NONE) |
|---|---|---|---|---|---|

FIG. 8.

MYSTREAM

| OBJ ID OF THIS P-STREAM | SEARCH CRITERIA 1 | SEARCH CRITERIA 2 | SEARCH CRITERIA 3 | SAVED = YES | SEQ DATA SET |
|---|---|---|---|---|---|

SEQUENTIAL DATA SET

| OBJ ID | PART# | STATUS | PART TYPE |
|---|---|---|---|
| OBJ ID | PART# | STATUS | PART TYPE |
| OBJ ID | PART# | STATUS | PART TYPE |
| OBJ ID | PART# | STATUS | PART TYPE |

FIG. 9.

PERSISTENT STREAM FOR PROCESSING TIME CONSUMING AND REUSABLE QUERIES IN AN OBJECT ORIENTED DATABASE MANAGEMENT SYSTEM

FIELD OF THE INVENTION

This invention relates to an object oriented database management system and more particularly to a process and apparatus for handling time consuming and reusable queries in an object oriented database management system.

BACKGROUND OF THE INVENTION

Object Oriented Programming systems and processes have been the subject of much investigation and interest in state of the art data processing environments. Object Oriented Programming is a computer program packaging technique which provides reusable and easily expandable programs. In contrast with known functional programming techniques which are not easily adaptable to new functional requirements and new types of data, object oriented programs are reusable and expandable as ne requirements arise. With the ever increasing complexity of computer based systems, object oriented programming has received increased attention and investigation.

In an object oriented programming system, the primary focus is on data, rather than functions. Object oriented programming systems are composed of a large number of "objects". An object is a data structure and a set of operations or functions that can access that data structure. The data structure may be represented as a "frame". The frame has many "slots", each of which contains an "attribute" of the data in the slot. The attribute may be a primitive (i.e. an integer or string) or an Object Reference which is a pointer to another object's instance or instances (defined below). Each operation (function) that can access the data structure is called a "method".

FIG. 1 illustrates a schematic representation of an object in which a frame is encapsulated within its methods. FIG. 2 illustrates an example of an object, in which the data structure relates to employee data and a number of methods surround this data structure. One method, for example, obtains the age of an employee. Each defined object will usually be manifested in a number of "instances". Each instance contains the particular data structure for a particular example of the object. For example, an object for individual employee named Joyce Smith is an instance of the "employee" object.

Object oriented programming systems provide two primary characteristics which allow flexible and reusable programs to be developed. These characteristics are referred to as "encapsulation" and "inheritance". As may be seen from FIG. 1, the frame is encapsulated by its methods (functions). A wall of code has been placed around each piece of data. All access to the frame is handled by the surrounding methods. Data independence is thereby provided because an object's data structure is accessed only by its methods. Only the associated methods know the internal data structure. This ensures data integrity.

The "inheritance" property of object oriented programming systems allows previously written programs to be broadened by creating new superclasses and subclasses of objects. New objects are described by how they differ from preexisting objects so that entirely new programs need not be written to handle new types of data or functions.

FIG. 3 illustrates the inheritance property. For ease of illustration, the objects are illustrated as rectangles rather than as circles, with the object name at the top of a rectangle, the frame below the object name and the methods below the frame. Referring to FIG. 3, three object classes are illustrated for "salesperson", "employee" and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates and R. Moore are employees. J. McEnro, R. Nader and R. Reagan are persons. In other words, an instance is related to its class by a "is a" relation.

Each subclass "inherits" the frame and methods of its superclass. Thus, for example, a salesperson frame inherits age and hire date objects as well as promote methods from the employee superclass. Salesperson also includes a unique quota attribute and a pay commission method. Each instance can access all methods and frames of its superclass, so that, for example, B. G. Blue can be promoted.

In an object oriented system, a high level routine requests an object to perform one of its methods by sending the object a "message" telling the object what to do. The receiving object responds to the message by choosing the method that implements the message name, executing this method and then returning control to the calling high level routine, along with the results of the method.

Object oriented programming systems may be employed as database management systems which are capable of operating upon a large database, and which are expandable and adaptable. In an object oriented database management system, the data in the database is organized and encapsulated in terms of objects, with the instances of the objects being the data in the database. Similarly, the database manager may be organized as a set of objects with database management operations being performed by sending messages from one object to another. The target object performs the requested action on its attributes using its methods.

In an object oriented database management system, the result of a database query produces an object called a "stream". The attributes of a stream comprise a list of the names (or other identifier) of all objects in a class of objects which satisfy the query. In other words, the stream attributes comprise a list of the subset of the class which meets the search criteria. Associated descriptive information may also be included in the attributes.

As is well known to those having skill in the art, queries of very large databases often are time consuming. For example, a query may need to search an object class having one million instances in order to find twenty instances which satisfy the search criteria. Unfortunately, such time consuming queries limit usability of the database system because the database system typically cannot be used for other queries when a time consuming query is being performed.

It is also known to those having skill in the art that many database query results must be retained for future use. If the result of a query will be used many times, it is desirable not to run the query multiple times to repeatedly obtain the same results. This is especially true of time-consuming queries which render the database unavailable during performance of the query.

SUMMARY OF THE INVENTION

It is therefore an object of the invention to provide a process and apparatus for performing queries in an object oriented database management system.

It is another object of the invention to provide a process and apparatus for performing time consuming queries in an object oriented database management system.

It is yet another object of the invention to provide a process and apparatus for performing reusable queries in an object oriented database management system.

These and other objects are obtained in an object oriented database management system according to the present invention, by providing a new object class called a "persistent stream". The persistent stream class is a subclass of the stream class so that it inherits all of the attributes and methods of the stream class. However, the persistent stream class includes a method not found in the stream class. This method provides the ability t persist. In particular, the persistent stream includes a "save" method for saving the results of a query of the database.

The persistent stream of the present invention has the ability to save the results of a query, yet in all other respects appears identical to normal streams when sent messages that are defined for a normal stream. Accordingly, the persistent stream may be used as a parameter by any messages that expect to receive a stream as a result. However, when a query names a persistent stream as its object, the query is performed in a background or batch mode and the results are saved until they are desired. A time consuming query may thereby be initiated, performed in background mode and then saved. When the persistent stream is accessed later, it is transparent to the accessing message whether the query was immediately performed or was performed earlier and saved. A persistent stream may also be employed when the results of a query need to be reused. A message may access the persistent stream, and it is transparent to the accessing method whether the query was performed immediately or was performed earlier and saved.

In particular, according to the invention, an object oriented database manager includes a stream class and a persistent stream class. The stream class is an object class having stream attributes and stream methods, with the stream attributes being a list of database objects satisfying a predetermined query criteria and the stream methods including methods to create, open, get, close, and delete a stream instance. The persistent stream class is a subclass of the stream class so that it inherits the stream attributes and stream methods. However, the persistent stream class attributes also include the search criteria, a flag to indicate whether search results have been saved and an indicator of the location of the search results. The stream class also includes a "save" method for saving the results of an operation on the database.

In operation, the database manager accepts queries to be performed on the database of data objects and a determination is made as to whether the accepted query is to be performed immediately and whether the results of the query are to be saved. It will be understood by those having skill in the art that this determination is typically made by the application program which runs as part of or in conjunction with the object oriented database manager. If the query is to be performed immediately and the results do not need to be saved for reuse, the query message is sent to the stream class. On the other hand, if the query is not to be performed immediately or if the results are to be saved for reuse, the database manager sends the query message to the persistent stream class. The persistent stream class performs the query just like a stream class, except the query results are performed in background and saved, for example as a sequential data set in a nonvolatile storage device.

Accordingly, any query function may create either a persistent or a nonpersistent stream. Persistent streams may be built in background whenever adequate system resources are available, and the user will be free to do other work. The work performing process may be fed either a regular stream or a persistent stream. Since persistent streams respond like nonpersistent streams for open, get, close and delete methods, the type of stream is totally transparent to the user of object oriented database management system.

The persistent stream class of the present invention may be used with a resumeable batch query object class which is described in copending application Ser. No. 07/425,829 filed Oct. 23, 1989, and entitled "Resumeable Batch Query for Processing Time Consuming Queries in an Object Oriented Database Management System," the disclosure of which is incorporated herein by reference. Alternatively, the resumeable batch query need not be used.

BRIEF DESCRIPTION OF THE DRAWINGS

FIG. 8 illustrates a persistent stream according to the present invention.

FIG. 9 illustrates a persistent stream and sequential data set according to the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

OBJECT ORIENTED DATABASE MANAGEMENT SYSTEM

In an object oriented computing system, work is accomplished by sending action request messages to an object which contains (encapsulates) data. The object will perform the requested action on the data according to its predefined methods. The requestor of the action need not know what the actual data looks like or how the object manipulates it.

An object's class defines the types and meanings of the data and the action requests (messages) that the object will honor. The individual objects containing data are called instances of the class. Classes generally relate to real-world things. A later example will use "Parts" as a class. The data elements (slots) of a part might be a part number, a status and a part type. The instances of this class represent individual parts, each with its own part number, status, and type information. The programs performing the requested actions are called methods of the class.

Object classes can be defined to be subclasses of other classes. Subclasses inherit all the data characteristics and methods of the present class. They can add additional data and methods, and they can override (redefine) any data elements or methods of the parent class. While most messages are sent to object instances, the message that requests that a new instance be created is sent to an object class. The class will cause a new instance to be created and will return an object identifier by which that object will be known.

The sender of an action request message need not know the exact class of the object to which it is sending the message. As long as the target object either defines a method to handle the message or has a parent class that defines such a method, then the message will be handled using the data in the object instance and the method in its class or its parent class. In fact, it need not be an immediate parent, but may be a parent's parent, etc. The sender of the method need only have the object ID of the receiving object. This property of object oriented programming is called "inheritance". The inheritance property is used in the present invention.

Figure 1:
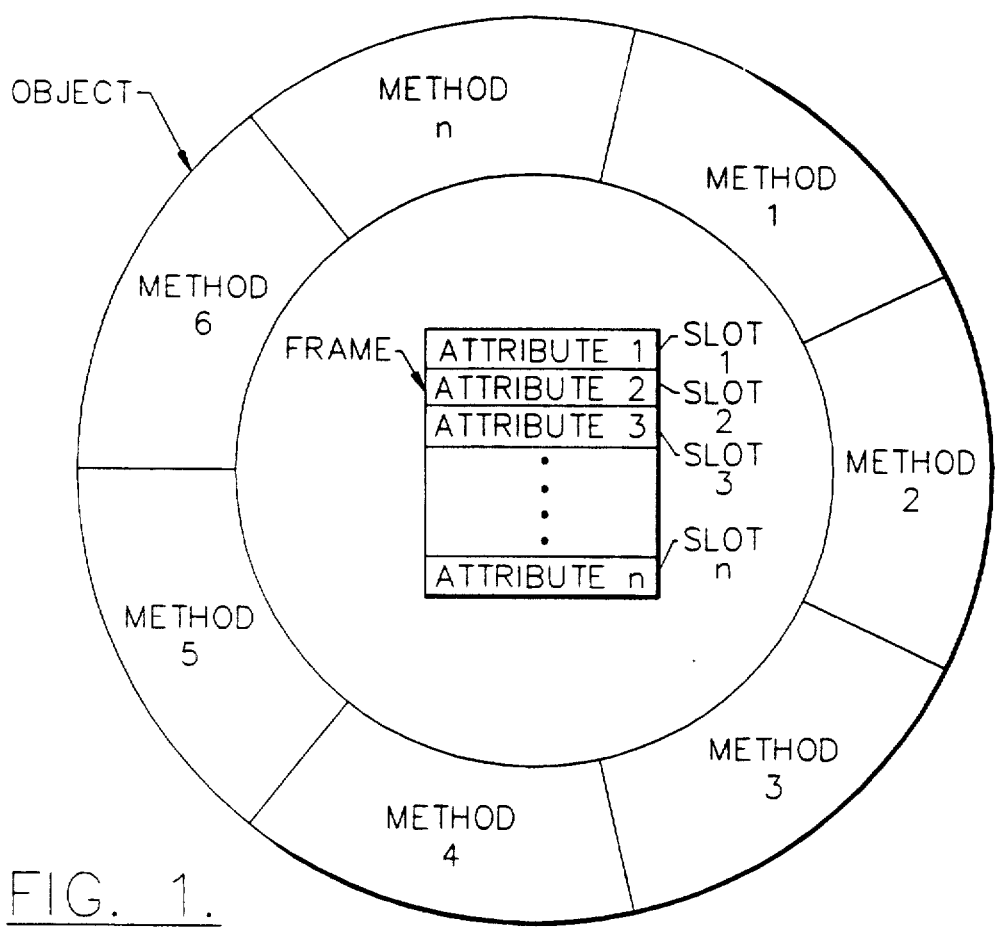
FIG. 1 illustrates a schematic representation of an object.
Figure 2:
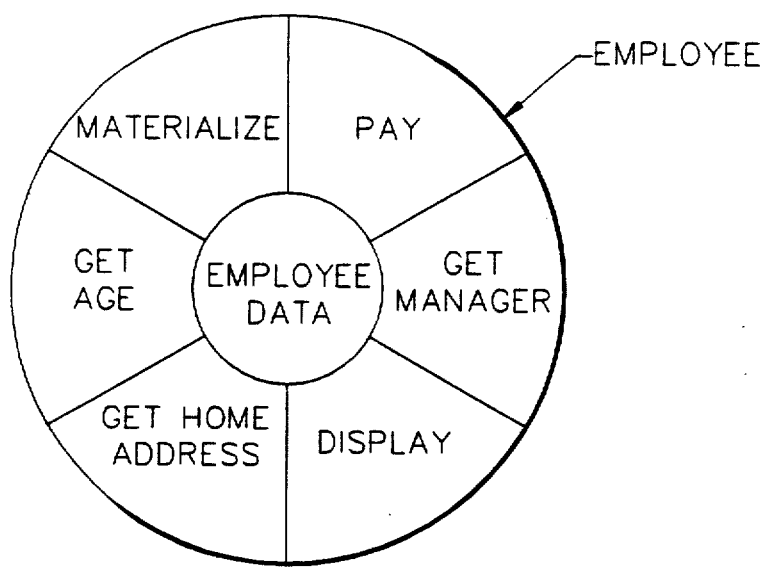
FIG. 2 illustrates a schematic representation of an example of an object.
Figure 3:
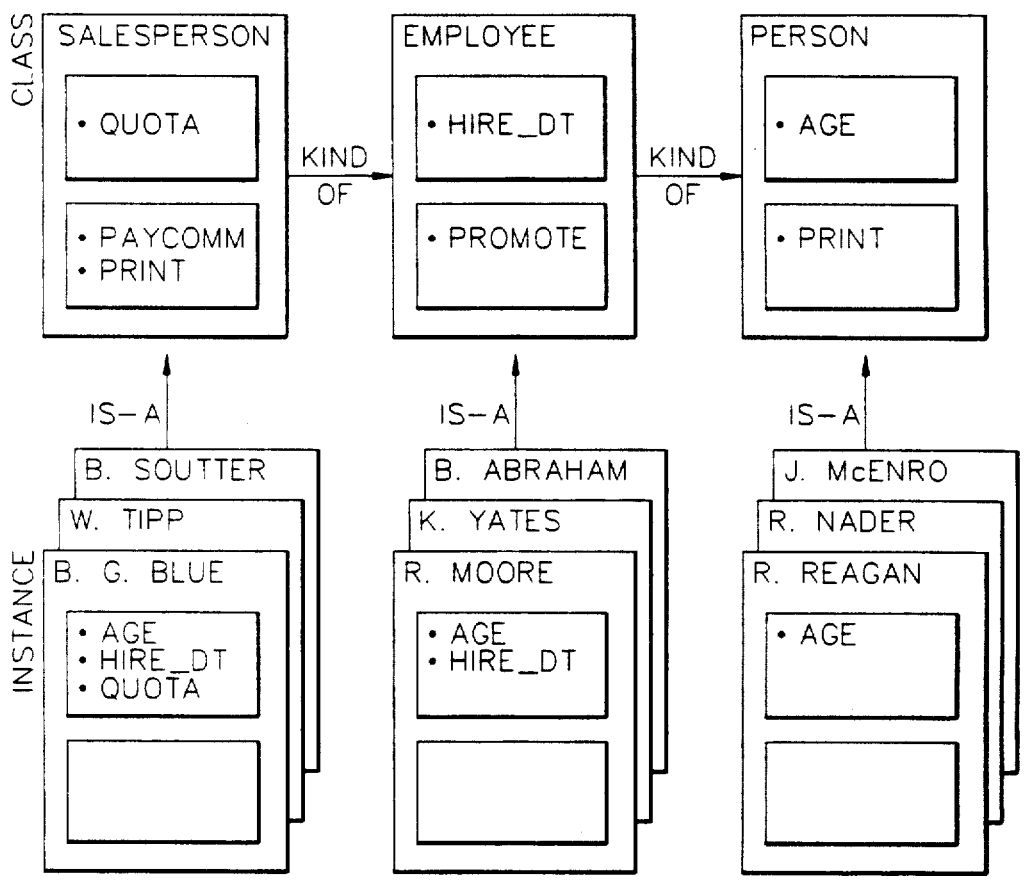
FIG. 3 illustrates the inheritance property of objects.
Figure 4:
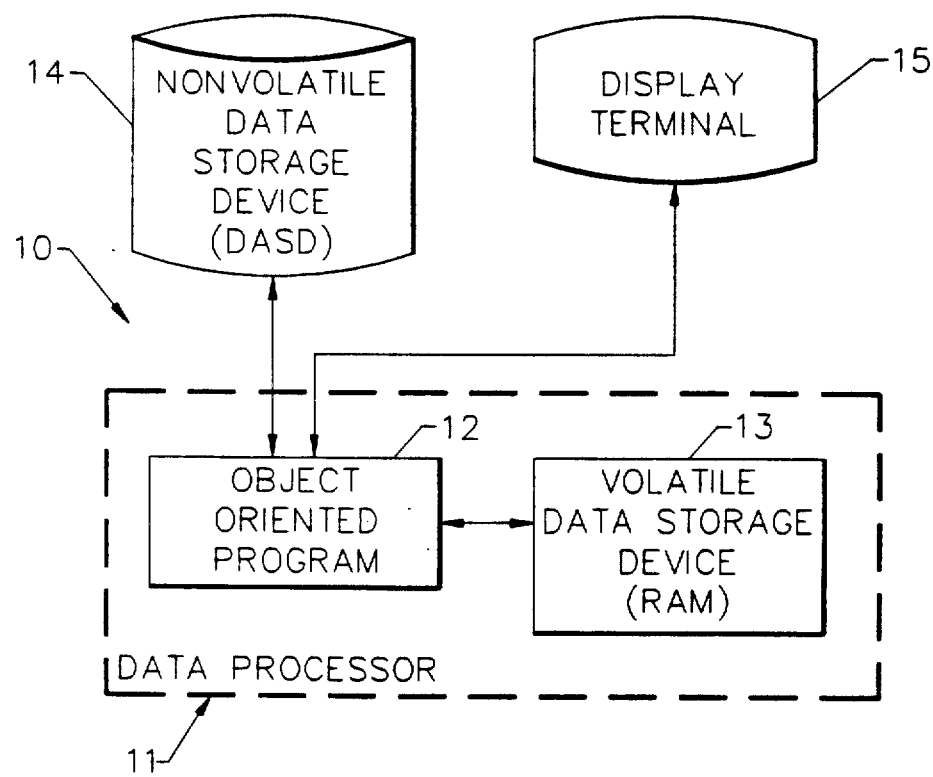
FIG. 4 illustrates a schematic block diagram of an object oriented computer system according to the present invention.

Referring now to FIG. 4, a schematic block diagram of an object Oriented database management system 10 is illustrated. The system 10 includes a data processor 11 which may be a mainframe computer, minicomputer or personal computer. For large databases having multiple users, a mainframe computer is typically employed. As is well known to those having skill in the art, the data processor 10 includes a volatile data storage device 13, typically random access memory (RAM) for providing a working store for active data and intermediate results. Data in RAM 13 is erased when power to the data processor 11 is removed or a new user session is begun. System 10 also includes a nonvolatile data storage device 14 for permanent storage of objects. Device 14 may be a direct access storage device (DASD-a disk file), a tape file, an erasable optical disk or other well known device. Nonvolatile data storage device 14 will also be referred to herein as a "database". Volatile data storage device 13 will also be referred to herein as "memory". A display terminal 15 including a cathode ray tube (CRT) or other display, and a keyboard, is also shown.

An object oriented program 12, in the form of an object oriented database manager, is also included in data processor 11. Object oriented database manager may be programmed in object oriented languages such as "C" or "Smalltalk" or variations thereof, or in conventional programming languages such as FORTRAN or COBOL. The design of an object oriented database manager is well known to those skilled in the art of object oriented programming systems, and will only be described generally below.

Figure 5:
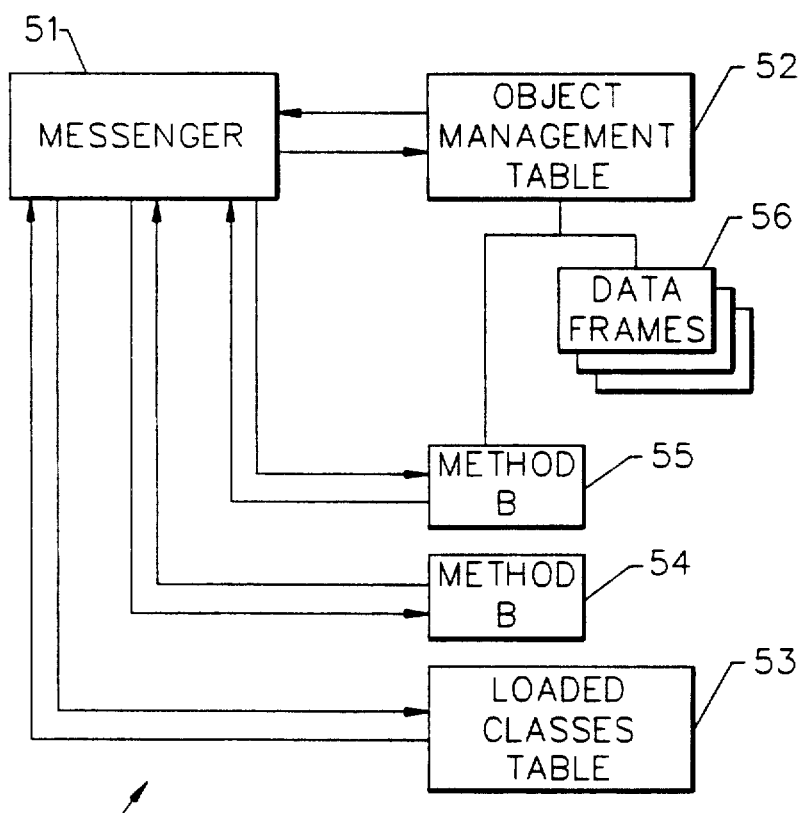
FIG. 5 illustrates a schematic block diagram of an object oriented program according to the present invention.

Referring now to FIG. 5, the main components of an object oriented program (12, FIG. 4) will be described. A more detailed description of the design and operation of an object oriented program is provided in "Object Oriented Software Construction", by Bertrand Meyer, published by Prentice Hall in 1988, the disclosure of which is incorporated herein by reference.

Referring to FIG. 5, object oriented program 12 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented program 12 will now be described for the example illustrated in FIG. 5, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

Objects may either be persistent or non-persistent. A persistent object consists of data that is stored in nonvolatile data storage device 14 and which is brought into processor storage (Ram 13) when it is first referenced by its object ID). It will be written back to the device 14 whenever any method determines that all object data is in a consistent state. This is called "committing" the data. Conventional data base systems, for example IBM's DB2 also include a commit function to assure that all data changes are reflected simultaneously. Persistent objects are described in copending application Ser. No. 07/425,824, filed Oct. 23, 1989, and entitled "Persistent Data Interface for Object Oriented Programming System", the disclosure of which is incorporated herein by reference. Non-persistent objects are those whose data need not be saved permanently and therefore are not represented in the DASD 14.

STREAMS

Figures 6, 7:
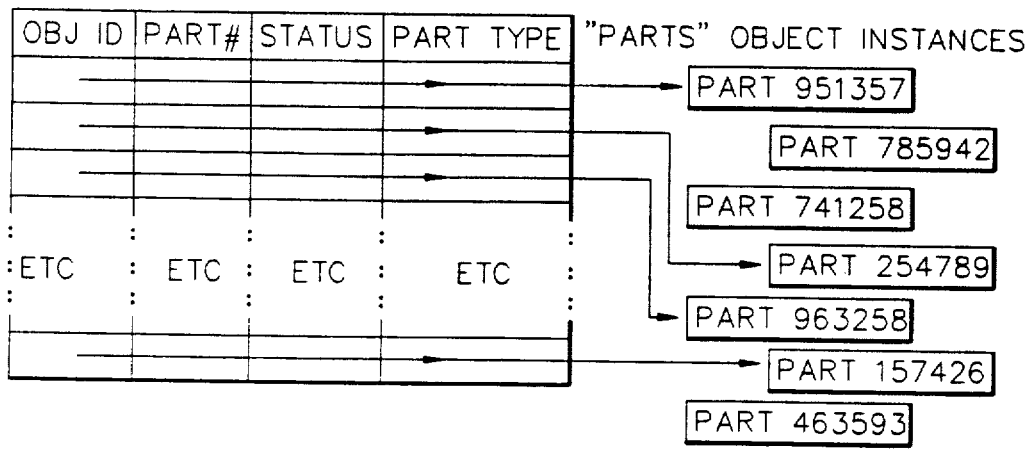
FIG. 6 illustrates an example of a stream according to the present invention.
FIG. 7 illustrates first and second dialog panels for performing a query of a database using a stream.

The present invention relates to a class of objects called a "stream". A stream is a list of the identifiers of all objects in any given class of objects and may include some associated descriptive information about each member of the class. This descriptive information generally represents only a few of the attributes of the underlying objects and is typically used for printed reports or lists displayed on a dialog panel on terminal 15. FIG. 6 illustrates an example of a stream of "Part Numbers". The Object ID (OID) in the stream is the Object ID of each of the actual objects that conform to the stream's search criteria.

A stream is built by a query to a database (such as a relational database). The query typically includes search criteria such that the stream is a list of the subset of the class that meets the search criteria. This building of a subset of a class can be quite time consuming, depending on the number of members of the class and the complexity of the search criteria.

Heretofore, streams were non-persistent objects. They represent a summary of data in a some class of persistent objects whose data is therefore in the underlying database. Thus the data in the stream is formed by repeated requests to the database for the next record that meets the selection criteria. There is no bound on a stream's size except for any bounds dictated by the underlying database system. A stream typically includes the following methods:

Create—Builds the skeleton of the stream object and returns the stream identifier to the requester. It receives as parameters any search criteria that are to be used to create a subset of the queried object class. A typical message to request construction of a stream is:

mystream.CREATE(criteria1, criteria2, . . . ,return_code)

where the values are as follows:
mystream—a variable, arbitrarily named "mystream" for this example, which is declared to be of the class of the stream that is needed, for example by:

mystream: type is part_number_stream;

The object ID of the newly created stream will be placed in this variable.
criteria1, etc.—the search criteria that are defined for the particular type of stream.
return_code—a variable for indicating whether any exceptions have occurred.
The stream object resources, such as the volatile storage (RAM) to remember the search criteria and to hold any other stream state information, are allocated when the CREATE method is performed.
Open—Indicates that the stream will presently be used, and causes the stream to perform whatever activity is needed to access the desired data records. A typical message to open a stream is:

mystream.OPEN(return_code)

where the values are as follows:

mystream—the object id of the stream returned by CREATE.
return_code—a variable for indicating whether any exceptions have occurred.
When an OPEN method is invoked, database resources are allocated to the stream, possibly locking out other users of this part of the database.
Get—Returns the next record of the stream to the requester. A typical message to get a record is:

mystream.GET(stream_element,return_code)

where the values are as follows:
mystream—the object id of the stream returned by CREATE.
stream_element—a variable defined to be of the type that represents a single row of the particular type of stream, such as one row of the stream shown in FIG. 6.
return_code—a variable for indicating whether any exceptions have occurred. End-of-stream is one such exception.
When a GET method is invoked, actual database records in nonvolatile storage device 14 (FIG. 4) are searched and brought into memory (RAM 13).
Close—Releases the database and removes any concept of stream position (current record number) from the stream. Accordingly, if a closed stream is later reopened, it will commence at the beginning and not the "next" record. A typical message to close the stream is:

mystream.CLOSE(return_code)

where the values are as follows:
mystream—the object id of the stream returned by CREATE.
return_code—a variable for indicating whether any exceptions have occurred.
When a CLOSE method is invoked the database resources are freed.
Delete—Releases all resources consumed by the stream. A typical message to delete the stream is:

mystream.DELETE(return_code)

where the values are as follows:
mystream—the object id of the stream returned by CREATE.
return_code—a variable for indicating whether any exceptions have occurred.
When the DELETE method is invoked, the object resources in RAM are freed and the stream's object ID is no longer valid.

EXAMPLE 1

Database Query Without Persistent Stream

A database query which does not employ the persistent stream of the present invention will now be described. A Create operation begins the query. The Create operation is typically requested by a work-gathering function such as an interactive dialog. The resulting stream is then passed to the function that will process the stream (build list panels, print reports, do verifications, etc.). A typical scenario would consist of a pair of interactive dialog panels on display terminal 15 as shown in FIG. 7.

Referring now to FIG. 7, the first dialog panel requests the selection criteria from the terminal user. Assume for this example that the user did not enter information for "Part#" and "Status" but entered "Plastic" as the "Type" to search for. This would request a search for all plastic type parts. The first dialog panel creates the stream, passing the following search criteria:

mystream.CREATE("*", "*", "Plastic",myrcode)

The asterisks are used as a wildcard character to indicate all values for the first two search criteria are desired. At this time, the stream simply remembers the search criteria in the storage (RAM) allocated to the stream object. The first dialog panel will then invoke the second dialog panel, passing it to the object ID of the stream as follows:

panel2.CREATE(mystream)

Still referring to FIG. 7, the second dialog panel OPENs the stream, and uses the GET function to build a list of objects (such as "parts") that the user may manipulate (edit, delete, promote, print, etc.) according to the needs of the particular application. The OPEN method connects to the database and identifies the data to be searched and the criteria to be used for the search:

mystream.OPEN(myrcode)

The GET method actually retrieves the records from the database:

mystream.GET(mybuffer,myrcode)

This GET can potentially take a large amount of time if a large number of database records need to be searched to obtain a relatively few that satisfy the search criteria.

After the GET retrieves the records from the database the user may perform the work the second dialog panel was designed to accomplish. For example, the user may scroll the list, causing more GET requests to the stream. Whenever the user issues commands to the objects listed on the panel, the object ID of the underlying object is used to send the action request to that underlying object. These object ID's are typically not presented to the user since they are not intended to be comprehensible to the user—they are used only to locate the underlying objects. When the user chooses to leave the second panel, the second dialog CLOSEs the stream to release the database resources:

mystream.CLOSE(myrcode)

The second dialog would then return to its invoker, which was the first dialog.

Since the first dialog created the stream, it must now DELETE the stream to free the object resources, as follows:

mystream.DELETE(myrcode)

The user may repeat the above described activity with the same or a different query, or the user may exit this panel to return to its invoker.

PERSISTENT STREAMS

The Persistent Stream class of the present invention will now be described. The persistent stream is a stream-like object class which has the ability to save the results of a query, yet appears identical to normal streams when sent action requests that are defined in the normal stream specification. The persistent stream class has all the characteristics of a stream but can also be saved as a persistent object. In object oriented terminology, it is a subclass of streams: it inherits all the attributes and of methods of streams, plus it provides additional function, i.e., its ability to persist.

The persistent stream of the present invention may be used by applications that expect to receive normal streams, however time consuming data base queries may be performed in a background (batch) environment. The persistent stream also may be used for queries that are performed in an interactive (foreground) environment, but whose results must be retained to be reused in the future.

Persistent streams include the same methods as normal streams, plus a new method called SAVE. For persistent streams the methods are defined as follows:
Create—Persistent streams respond to the same CREATE message as do normal streams:

mystream.CREATE(criteria1, criteria2, . . .
        ,return_code)

except that the variable "mystream" will be declared to be the needed persistent stream class, such as:

mystream: type is part_number_persistent_stream;

The CREATE method will create a persistent object and store this object in the database. This persistent object will be used to save the search criteria and to remember whether the SAVE action has been done and where the query results have been stored. The query results can be stored in any nonvolatile sequential storage medium, for example sequential data storage device 14 (FIG. 4). FIG. 8 illustrates the persistent stream which has just been created and whose object ID is in "mystream". The persistent stream object has an object ID assigned and stored so that it can be found. The search criteria are stored, the flag indicates no SAVE has been performed, and there is no sequential data set yet.

Save—Performs the entire query and places the results in a sequential data set. This method is new for persistent streams. A typical message to save a stream is:

mystream.SAVE(return_code)

where the values are as follows:
mystream—the object id of the stream returned by CREATE.
return_code—a variable for indicating whether any exceptions have occurred.
Before the SAVE, the persistent stream appears as shown in FIG. 8. The SAVE method allocates the sequential data set and places its name (or other identifier) into the persistent stream object. It then performs the equivalent of the normal stream's OPEN, connecting to the database for the query. It next performs repeated GETs from the database to obtain the next query record and writes that record to the sequential data set. Repeated GETs are performed until the database indicates that the last query record has been fetched. The SAVE method then closes the sequential data set and sets the indicator in the persistent stream object to indicate that a SAVE has been done. The persistent stream and sequential data set now appear as illustrated in FIG. 9.

Open—Persistent streams respond to the same OPEN message as do normal streams:

mystream.OPEN(return_code)

If the SAVE operation has been performed for this persistent stream instance, the OPEN action will connect to the sequential data set instead of the database, thus not tying up any database resources and not locking out any other users. If the SAVE operation has not been performed for this persistent stream, then OPEN behaves identically as it does for normal streams, connecting to the database.

Get—Persistent streams respond to the same GET message as do normal streams:

mystream.GET(stream_element,return_code)

If the SAVE operation has been performed for this persistent stream instance, the GET method will read from the sequential data set instead of the database. This typically requires much less overhead than database fetches. If the SAVE operation has not been performed for this persistent stream, then GET behaves identically as it does for normal streams, fetching from the database.

Close—Persistent streams respond to the same CLOSE message as do normal streams:

mystream.CLOSE(return_code)

If the SAVE operation has been performed for this persistent stream instance, the CLOSE action will disconnect from the sequential data set instead of from the database. If the SAVE operation has not been performed for this persistent stream, then CLOSE behaves identically as it does for normal streams, disconnecting the database resources.

Delete—Persistent streams respond to the same DELETE message as do normal streams:

mystream.DELETE(return_code)

If the SAVE operation has been performed for this persistent stream instance, the DELETE action will delete the sequential data set and then delete the persistent stream object resources themselves. If the SAVE operation has not been performed for this persistent stream, then DELETE behaves identically as it does for normal streams, deleting the persistent stream object resources. At this time the object resources are freed and the stream's object ID is no longer valid.

EXAMPLE 2

Database Query With Persistent Stream

The database query of FIG. 7 will now be described using persistent streams, in order to illustrate the advantages of the present invention over known streams. As illustrated in FIG. 7, the first dialog panel requests the selection criteria from the terminal user, and CREATEs the stream, passing in the same search criteria:

mystream.CREATE("*", "*", "Plastic",myrcode)

However, this time, "mystream" has been declared to be a persistent stream and the CREATE message will be routed to the persistent stream class for execution. The asterisks are again wildcard characters. A database record is inserted for this new instance of a persistent stream, and its Object ID, the three search criteria, the SAVED=No flag, and a null sequential data set pointer are written to that new record, as illustrated in FIG. 8.

Next, the first dialog panel will cause the persistent stream's query to be run. It will be understood that the query may be run differently depending upon the reason that a persistent stream was used. For example, if the query results will be used more than once, then the persistent stream's query may be run interactively. The user may be asked to indicate whether the query results will be used more than once. Alternatively, if the query operation may take a long time to run, a batch (background) job may be created to do the query during off-peak hours. The user may be asked to indicate whether this is a time consuming query. Alternatively, the query may be examined and an estimated run time may be calculated and compared to a predetermined time. If the estimated run time exceeds the predetermined time a batch query may be automatically performed.

Whenever the query is run, the persistent stream is sent a message to cause it to run its SAVE method:

mystream.SAVE(myrcode)

As was described above, the SAVE method will allocate a sequential data set, place its name in the database, run the query, write the results in the sequential data set, and change the flag to SAVED=Yes. One technique for implementing the SAVE method is to use the OPEN, GET and CLOSE methods of the parent object class (normal streams), thus avoiding having to write those programs twice.

Next, the second dialog panel of FIG. 7 is invoked. If the query was run interactively by the first dialog, then the second dialog is invoked identically to Example 1. If a background job ran the query, a "job done" dialog would typically invoke the second dialog panel. In either case, the second dialog panel would be invoked with same message as in the scenario using normal stream example:

panel2.CREATE(mystream)

According to the invention, the second dialog would be unaware that it received a persistent stream rather than a normal stream. As in Example 1, the second dialog panel would OPEN the stream, and use the GET function to build a list of objects for the user to manipulate:

mystream.OPEN(myrcode)

For the persistent stream, the OPEN method interrogates the SAVED flag in its record of the database. Since a save has been done, it connects the sequential database whose identifier is also in the database. The GET actually retrieves the query records:

mystream.GET(mybuffer,myrcode)

Since the persistent stream had been saved, the query results are read from the sequential data set. Since only records that have satisfied the query are in this data set, the amount of processing needed at 'stream usage' time is typically much less than that of the query that produced the results.

If the SAVE method had not been run for the persistent stream, a query would be done at this time. Various techniques may be used to do this. For example, the query code may be provided as part of the Persistent Stream. Alternatively, the query requests may be rerouted to the parent's (normal stream) OPEN, GET and CLOSE methods. Alternatively, a SAVE may be implicitly run as part of the implementation of persistent stream OPEN.

The user may then perform desired work using the second dialog panel. For example, the user may scroll the list, causing more GET requests to be applied to the stream and more results to be read from the sequential data set. Whenever the user issues commands to the objects listed on the second panel, the object ID of the underlying object is used to send the action request to that underlying object.

When the user chooses to leave the second panel, the second dialog CLOSEs the stream:

mystream.CLOSE(myrcode)

For SAVEd persistent streams, this disconnects from the sequential data set. The second dialog may then return to its invoker. Since the persistent streams are persistent, the invoker may not always wish to delete the stream at this point. However, whenever the application and/or the user determines that the persistent stream is no longer needed, a DELETE message is sent to the stream:

mystream.DELETE(myrcode)

The sequential data set is itself deleted, the database record is deleted, and all other resources are freed.

As described above, the persistent stream class of the present invention provides the ability to save query results in such a manner that the persistence or nonpersistence of the query results is transparent to the eventual work-performing program that uses the query results. Persistent streams may be SAVEd in the background when system resources are more plentiful, leaving the foreground interactive user free to do other work. The work-performing process may be fed either a regular stream or a persistent stream. It will send the same messages to the stream, regardless of which type of stream it receives. Since persistent streams respond identical to normal streams for the Open, Get, Close, and Delete messages, the type of stream is totally transparent to the user of the stream, thus avoiding the need to write the program code twice for different types of data sources.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. An object oriented database management system comprising:

a data storage device;

a database of data objects stored in said data storage device;

a data processor connected to said data storage device;

an object oriented database manager operating in said data processor, for performing queries of said database of data objects, said database manager including a stream class and a persistent stream class of objects;

said stream class of objects comprising a plurality of stream class attributes and at least one stream class method, said stream class attributes comprising a list of data objects which result from a query performed by said object oriented database manager; and said persistent stream class of objects comprising a plurality of persistent stream class attributes and at least one persistent stream class method, said persistent stream class being organized as a subclass of said stream class to thereby inherit said stream class attributes and said at least one stream class method, said at least one persistent stream class method further comprising a save method for saving the list of data objects which result from a query performed by said object oriented database manager in said data storage device.

2. The object oriented database management system of claim 1 wherein said save method comprises:

means for allocating a location in said data storage device for saving therein the list of data objects which result from a query;

means for obtaining the list of data objects which result from a query;

means for saving the list of data objects which results from a query in the allocated location; and means for indicating that the list of data objects which result from a query have been obtained and saved.

3. The object oriented database management system of claim 2 wherein said means for obtaining comprises means for serially obtaining each data object in said database which results from the query.

4. The object oriented database management system of claim 3 wherein said means for saving comprises means for saving each data object in said database which results from the query, in the allocated location in the data storage device.

5. The object oriented database management system of claim 2 wherein said persistent stream class attributes further comprise a first indicator of whether the list of data objects which result from a query have been saved in said data storage device, and a second indicator of the location in said data storage device where the list of data objects which result from a query have been saved, and wherein said means for indicating comprises means for setting said first indicator and means for placing the allocated location into said second indicator.

6. The object oriented database management system of claim 1 wherein said database manager further comprises:

means for accepting a query to be performed on said database of data objects;

means for determining whether an accepted query is to be saved;

means for sending a query message to said persistent stream class object if an accepted query is to be saved; and means for sending a query message to said stream class if an accepted query is not to be saved.

7. The object oriented database management system of claim 6 wherein said determining means comprises means for accepting an indication that an accepted query is to be performed immediately; and means for determining that an accepted query is not to be saved if the accepted query is to be performed immediately.

8. The object oriented database management system of claim 6 wherein said determining means comprises means for accepting an indication that the accepted query is to be reused; and means for determining that an accepted query is to be saved if the accepted query is to be reused.

9. The object oriented database management system of claim 6 wherein said determining means comprises means for estimating the time required for processing an accepted query, and means for determining that an accepted query is to be saved if the estimated processing time exceeds a predetermined time.

10. The object oriented database management system of claim 1 wherein said data storage device comprises a nonvolatile data storage device.

11. The object oriented database management system of claim 10 wherein said nonvolatile data storage device comprises a direct access storage device.

12. The object oriented database management system of claim 1 wherein said persistent stream class attributes further comprise a list of query criteria for a query.

13. The object oriented database management system of claim 1 wherein said persistent stream class attributes further comprise a first indicator of whether the list of data objects which result from a query have been saved in said data storage device, and a second indicator of the location in said data storage device where the list of data objects which result from a query have been saved.

14. The object oriented database management system of claim 1 wherein said at least one stream class method comprises create, open, get, close and delete methods.

15. A process for saving query results in an object oriented database management system comprising a data storage device having a database of data objects stored therein and a data processor connected to the data storage device and having an object oriented database manager operating therein for performing queries of said database, said query saving process comprising the steps of:
providing a stream class of objects comprising a plurality of stream class attributes and at least one stream class method, said stream class attributes comprising a list of data objects which result from a query performed by the object oriented database manager;
providing a persistent stream class of objects comprising a plurality of persistent stream attributes and at least one persistent stream class method, said at least one persistent stream class method comprising a save method for saving the list of data objects which result from a query in said data storage device; and
arranging said persistent stream class to be a subclass of said stream class, said persistent stream class thereby inheriting said stream class attributes and said at least one stream class method.

16. The query result saving process of claim 15 wherein said save method performs the steps of:
allocating a location in said data storage device for saving therein the list of data objects which result from a query;
obtaining the list of data objects which result from a query;
saving the list of data objects which results from a query in the allocated location; and
indicating that the list of data objects which result from a query have been obtained and saved.

17. The query result saving process of claim 16 wherein said obtaining step comprises the step of repeatedly obtaining each data object in said database which results from the query.

18. The query result saving process of claim 17 wherein said saving step comprises the step of serially saving each data object in said database which results from the query, in the allocated location in the data storage device.

19. The query result saving process of claim 16 wherein said persistent stream class attributes further comprise a first indicator of whether the list of data objects which result from a query have been saved in said data storage device, and a second indicator of the location in said data storage device where the list of data objects which result from a query have been saved, and wherein said indicating step comprises the step of setting said first indicator, and placing the allocated location into said second indicator.

20. The query result saving process of claim 15 further comprising the steps of:
accepting queries to be performed on said database of data objects;
determining whether an accepted query is to be saved;
sending a query message to said persistent stream class if an accepted query is to be saved; and
sending a query message to said stream class if an accepted query is not to be saved.

21. The query result saving process of claim 20 wherein said determining step comprises the steps of:
accepting an indication that an accepted query is to be performed immediately; and
determining that an accepted query is not to be saved if the accepted query is to be performed immediately.

22. The query result saving process of claim 20 wherein said determining step comprises the steps of:
accepting an indication that an accepted query is to be reused; and
determining that an accepted query is to be saved if the accepted query is to be reused.

23. The query result saving process of claim 20 wherein said determining step comprises the steps of:
estimating the time required for processing an accepted query; and
determining that an accepted query is to be saved if the estimated processing time exceeds a predetermined time.

24. The query result saving process of claim 15 wherein said persistent stream class attributes further comprise a list of query criteria for a query.

25. The query result saving process of claim 15 wherein said persistent stream class attributes further comprise a first indicator of whether the list of data objects which result from a query have been saved in said data storage device, and a second indicator of the location in said data storage device where the list of data objects which result from a query have been saved.

* * * * *

UNITED STATES PATENT AND TRADEMARK OFFICE
CERTIFICATE OF CORRECTION

PATENT NO. : 5,161,225
DATED : November 3, 1992
INVENTOR(S) : Abraham et al.

It is certified that error appears in the above-identified patent and that said Letters Patent is hereby corrected as shown below:

Title page, col. 2, under
   OTHER PUBLICATIONS:

Line 6, after "change" please insert --Objects--.

Line 7, please delete ", Apr. 1989".

In the ABSTRACT:

Line 9, "it" should be --its--.

Column 1, line 24, "ne" should be --new--.

Column 2, line 18, "McEnro" should be --McEnroe--.

Column 2, line 20, "a" should be --an--.

Column 3, line 26, "t" should be --to--.

Column 5, line 45, "Oriented" should be --oriented--.

Column 6, line 58, "Ram" should be --RAM--.

Column 6, line 59, after "ID" please delete --)--.

Column 6, line 62, "data base" should be --database--.

UNITED STATES PATENT AND TRADEMARK OFFICE
CERTIFICATE OF CORRECTION

PATENT NO. : 5,161,225
DATED : November 3, 1992
INVENTOR(S) : Abraham et al.

It is certified that error appears in the above-identified patent and that said Letters Patent is hereby corrected as shown below:

Column 8, line 1, "id" should be --ID--.

Column 8, line 14, "id" should be --ID--.

Column 8, line 36, "id" should be --ID--.

Column 8, line 48, "id" should be --ID--.

Column 10, line 52, "id" should be --ID--.

Column 15, line 10, after "The" delete --,--.

Column 15, line 42, after "query" insert --result--.

Signed and Sealed this

Ninth Day of November, 1993

BRUCE LEHMAN

Attest:

Attesting Officer

Commissioner of Patents and Trademarks